US010452839B1

(12) United States Patent
Curtin et al.

(10) Patent No.: US 10,452,839 B1
(45) Date of Patent: Oct. 22, 2019

(54) CASCADE CLASSIFIER ORDERING

(71) Applicant: Symantec Corporation, Mountain View, CA (US)

(72) Inventors: Ryan Curtin, Atlanta, GA (US); Aleatha Parker-Wood, Palo Alto, CA (US); Reuben Feinman, Mountain View, CA (US)

(73) Assignee: Symantec Corporation, Mountain View, CA (US)

( * ) Notice: Subject to any disclaimer, the term of this patent is extended or adjusted under 35 U.S.C. 154(b) by 136 days.

(21) Appl. No.: 15/374,624

(22) Filed: Dec. 9, 2016

(51) Int. Cl.
G06F 21/00 (2013.01)
G06F 21/55 (2013.01)
G06N 20/00 (2019.01)
G06K 9/62 (2006.01)

(52) U.S. Cl.
CPC ............ G06F 21/55 (2013.01); G06N 20/00 (2019.01); *G06K 9/6256* (2013.01)

(58) Field of Classification Search
CPC .............................. G06F 21/55; G06N 99/005
See application file for complete search history.

(56) References Cited

U.S. PATENT DOCUMENTS

2007/0112701 A1* 5/2007 Chellapilla .......... G06K 9/6256 706/15
2009/0094486 A1* 4/2009 Dipper ................ G06F 11/3684 714/38.14
2016/0275152 A1* 9/2016 Gunjan ..................... G06N 5/02
2018/0139214 A1* 5/2018 Anderson ............. H04L 63/145

FOREIGN PATENT DOCUMENTS

CN 106326125 A * 1/2017 ............. G06F 11/36

OTHER PUBLICATIONS https://wiki.eecs.yorku.ca/course_archive/2011-12/F/4403_media/04048399.pdf.
https://www.microsoft.com/en-us/research/publication/combining-multiple-classifiers-for-faster-optical-characterrecognition/.
http://machinelearning202.pbworks.com/w/file/fetch/60606349/breiman_randomforests.pdf.
http://www.cslu.ogi.edu/~bedricks/courses/cs506-pslc/articles/week3/sgradboostedtrees.pdf.
http://www.public.asu.edu/~jye02/CLASSES/Fall-2005/PAPERS/boosting-icml.pdf.

* cited by examiner

*Primary Examiner* — Jason K Gee
*Assistant Examiner* — Ka Shan Choy
(74) *Attorney, Agent, or Firm* — Holland & Hart LLP

(57) ABSTRACT

A method for improving cascade classifier ordering is described. In one embodiment, the method may include determining an efficacy rating of a first current configuration, generating a decreasing sequence of values for a control parameter, and selecting a current value of the control parameter according to the decreasing sequence of values. In some cases, the method may include randomly selecting a first test configuration among the plurality of configurations based at least in part on the current value of the control parameter, analyzing the first test configuration in relation to the first current configuration, and implementing, based at least in part on the analyzing of the first test configuration, the first test configuration in a machine learning classification system of a computing device to improve a data classification accuracy of the computing device.

19 Claims, 7 Drawing Sheets

CASCADE CLASSIFIER ORDERING

BACKGROUND

The use of computer systems and computer-related technologies continues to increase at a rapid pace. This increased use of computer systems has influenced the advances made to computer-related technologies. Computer systems have increasingly become an integral part of the business world and the activities of individual consumers. Computer systems may be used to carry out several business, industry, and academic endeavors.

The wide-spread use of computers and mobile devices has caused an increased presence of malicious programs such as rootkits, spyware, trojans, and the like. Malware programmers are continually adapting to the improvements made in malware detection, which creates an ongoing cycle of malware techniques adapting to improvements in malware detection.

SUMMARY

According to at least one embodiment, a method for improving cascade classifier ordering is described. In one embodiment, the method may include determining an efficacy rating of a first current configuration, generating a decreasing sequence of values for a control parameter, and selecting a current value of the control parameter according to the decreasing sequence of values. In some cases, the method may include randomly selecting a first test configuration among the plurality of configurations based at least in part on the current value of the control parameter, analyzing the first test configuration in relation to the first current configuration, and implementing, based at least in part on the analyzing of the first test configuration, the first test configuration in a machine learning classification system of a computing device to improve a data classification accuracy of the computing device.

In some cases, a distance of the first test configuration from the first current configuration may be selected according to a probability distribution with a scale depending on the current value of the control parameter. In some cases, the first current configuration may include a first set of classifiers in a first order, and the first test configuration may include a second set of classifiers in a second order different than the first order. In some embodiments, at least one of the first and second set of classifiers may include cascade classifiers.

In some embodiments, the method may include identifying an efficacy rating of the first test configuration and comparing the efficacy rating of the first test configuration to the efficacy rating of the first current configuration. In some embodiments, the method may include discarding the first current configuration and designating the first test configuration as a second current configuration when the efficacy rating of the first test configuration is greater than the efficacy rating of the first current configuration.

In some embodiments, the method may include determining whether an iteration threshold is satisfied, the iteration threshold being based on whether a maximum number of iterations have been processed, or whether a time budget is used up, or any combination thereof. In some embodiments, the method may include implementing the second current configuration in the machine learning classification system when the iteration threshold is satisfied.

In some embodiments, when the iteration threshold is not yet satisfied, the method may include decreasing the value of the control parameter according to the decreasing sequence of values and randomly selecting a second test configuration among the plurality of configuration based at least in part on the decreased value of the control parameter. In some embodiments, the method may include analyzing the second test configuration in relation to the second current configuration.

In some embodiments, when the efficacy rating of the second test configuration is equal to or less than the efficacy rating of the second current configuration, the method may include decreasing the value of the control parameter according to the decreasing sequence of values and randomly selecting a third test configuration among the plurality of configuration based at least in part on the decreased value of the control parameter. In some embodiments, the method may include analyzing the third test configuration in relation to the second current configuration and performing a security action using at least one the second current configuration and the third test configuration in the machine learning classification system.

A computing device configured for improving cascade classifier ordering is also described. The computing device may include a processor and memory in electronic communication with the processor. The memory may store computer executable instructions that when executed by the processor cause the processor to perform the steps of determining an efficacy rating of a first current configuration, generating a decreasing sequence of values for a control parameter, and selecting a current value of the control parameter according to the decreasing sequence of values. In some cases, the memory may store computer executable instructions that when executed by the processor cause the processor to perform the steps of randomly selecting a first test configuration among the plurality of configurations based at least in part on the current value of the control parameter, analyzing the first test configuration in relation to the first current configuration, and implementing, based at least in part on the analyzing of the first test configuration, the first test configuration in a machine learning classification system of a computing device to improve a data classification accuracy of the computing device.

A non-transitory computer-readable storage medium storing computer executable instructions is also described. When the instructions are executed by a processor, the execution of the instructions may cause the processor to perform the steps of determining an efficacy rating of a first current configuration, generating a decreasing sequence of values for a control parameter, and selecting a current value of the control parameter according to the decreasing sequence of values. In some cases, the memory may store computer executable instructions that when executed by the processor cause the processor to perform the steps of randomly selecting a first test configuration among the plurality of configurations based at least in part on the current value of the control parameter, analyzing the first test configuration in relation to the first current configuration, and implementing, based at least in part on the analyzing of the first test configuration, the first test configuration in a machine learning classification system of a computing device to improve a data classification accuracy of the computing device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
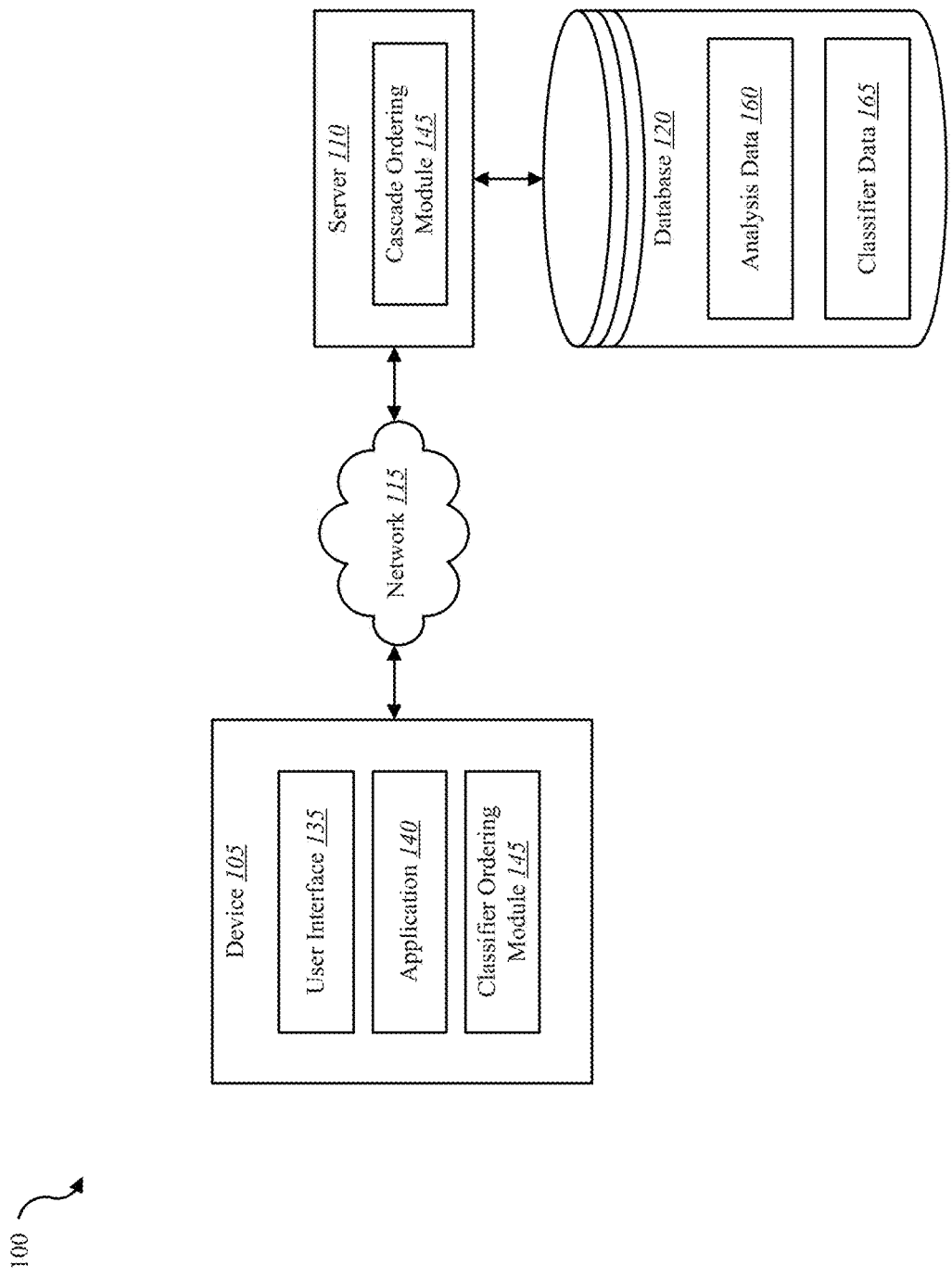
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The systems and methods described herein relate to improving statistical classification. More specifically, the systems and methods described herein relate to improving cascade classifier ordering in relation to the detection and/or identification of certain types of files such as malware files and clean files.

Cascading is a particular case of ensemble learning based on the concatenation of several classifiers, using all information collected from the output from a given classifier as additional information for the next classifier in the cascade. Unlike voting or stacking ensembles, which are multi-expert systems, cascading is a multistage system. Cascading classifiers may be trained using a set of pre-classified samples such as a set of files that contains known malware file and known clean files. After the classifier is trained it can be applied to unknown file to classify the file such as classifying an unknown file as containing malware or being clean from malware.

Simulated annealing (SA) is a probabilistic technique for approximating the global optimum of a given function. Specifically, it is a metaheuristic to approximate global optimization in a large search space. Simulated annealing interprets slow cooling as a slow decrease in the probability of accepting worse solutions as it explores a solution space. Accepting worse solutions is a fundamental property of metaheuristics because it allows for a more extensive search for the optimal solution outside local optimums.

Cascade classifiers are useful because of both computation time and also because not all features are available for each query point. In some cases, a classifier may not be able to produce a prediction with any accuracy, and therefore must pass to the next classifier in the cascade. A current problem with cascade classifiers is that the order of the classifiers may be selected by manual inspection. In some cases, selection of the order of classifiers by manual inspection may result in a sub-optimum ordering of the classifiers, which when implemented, may result in less accurate classifying of unknown objects. Accordingly, the present systems and methods include processes of at least one of hardware, firmware, software, or any combination thereof, that automate the selection of the order of cascade classifiers in a machine learning classification system.

In one embodiment of a set of cascade classifiers, each classifier may be assigned a precedence. A file being classified, then, first visits the classifier with highest precedence, and if that classifier does not convict the file as malware or exonerate the file as being clean from malware, then the next classifier is visited in the sequence of classifiers, and so forth. The ordering (or precedence) of the individual classifiers may have a significant impact on the efficacy of the cascade classifier system. However, aspects such as the number of classifiers, the number of possible combinations of classifiers, the variable settings of the classifiers such as thresholds, and so forth, make it difficult for a human or even a machine to find the optimal ordering of classifiers within a reasonable amount of time.

Accordingly, the present systems and methods may employ simulated annealing to optimize the ordering of classifiers in a cascade classifier system. This optimization approach enables the system to identify a optimum classification performance of the cascade, resulting in an increase in the rate of convictions of malicious objects while either keeping the same rate of false positives or reducing the rate of false positives.

For a given cascade classifier system, which consists of multiple individual classifiers, each with their own performance characteristics, the system may have an initial ordering of the classifiers. For example, the cascade classifier system may start with approximately 150 classifiers in a distinct ordering. In some cases, a simulated annealing algorithm may be used to optimize the cascade classifier ordering. In some cases, the algorithm may depend on a temperature schedule according to a function that provides a temperature T in relation to a current iteration number. In general, the temperature schedule may start with a high value of T and decay or decrease in value in a predetermined manner. The algorithm may include the steps of setting the annealing temperature T according to a predetermined temperature schedule, randomly selecting a new neighboring configuration, evaluating the efficacy E_new of the proposed configuration in relation to the efficacy E_curr of the current configuration. In some cases, the algorithm may include determining whether E_new is greater than E_old. When E_new is greater than E_old, the algorithm may select the new configuration as the new current configuration. Otherwise, the algorithm may include selecting another new configuration in relation to a probability proportional to the decrease in efficacy (e.g., difference between E_new and E_old) adjusted by the annealing factor corresponding to the temperature at this iteration. The algorithm may include repeating these steps until a maximum number of iterations are reached and/or until a time budget is used up.

FIG. 1 is a block diagram illustrating one embodiment of an environment 100 in which the present systems and methods may be implemented. In some embodiments, the systems and methods described herein may be performed on a device (e.g., device 105). As depicted, the environment 100 may include a device 105, server 110, database 120, and a network 115 that allows the device 105, the server 110, and database 120 to communicate with one another.

Examples of the device 105 may include any combination of mobile devices, smart phones, personal computing devices, computers, laptops, desktops, servers, media content set top boxes, or any combination thereof. Examples of server 110 may include any combination of a data server, a cloud server, an automation server, proxy server, mail server, web server, application server, database server, communications server, file server, home server, mobile server, name server, or any combination thereof.

In some configurations, the device 105 may include a user interface 135, application 140, and classifier ordering module 145. Although the components of the device 105 are depicted as being internal to the device 105, it is understood that one or more of the components may be external to the device 105 and connect to device 105 through wired and/or wireless connections. In some embodiments, application 140 may be installed on a remote computing device in order to allow a remote user to interface with a function of device 105, classifier ordering module 145, and/or server 110.

In some embodiments, device 105 may communicate with server 110 via network 115. Examples of network 115 may include any combination of cloud networks, local area networks (LAN), wide area networks (WAN), virtual private networks (VPN), wireless networks (using 802.11, for example), cellular networks (using 3G and/or LTE, for example), etc. In some configurations, the network 115 may include the Internet. It is noted that in some embodiments, the device 105 may not include a classifier ordering module 145. For example, device 105 may include application 140 that allows device 105 to interface with a remote device via classifier ordering module 145 located on another device such as a remote computing device and/or server 110. In some embodiments, device 105 and server 110 may include a classifier ordering module 145 where at least a portion of the functions of classifier ordering module 145 are performed separately and/or concurrently on device 105 and/or server 110. Likewise, in some embodiments, a user may access the functions of device 105 (directly or through device 105 via classifier ordering module 145) from a remote computing device. For example, in some embodiments, a remote computing device includes a mobile application that interfaces with one or more functions of device 105 classifier ordering module 145, and/or server 110.

In some embodiments, server 110 may be coupled to database 120. Database 120 may be internal or external to the server 110. In one example, device 105 may be coupled directly to database 120, database 120 being internal or external to device 105. Database 120 may include analysis data 160 and classifier data 165. For example, device 105 may access analysis data 160 in database 120 over network 115 via server 110. Analysis data 160 may include data regarding control parameters, iteration thresholds, efficacy ratings of a configuration or group of classifiers, or any combination thereof. Classifier data 165 may include data related to classifiers, classifier configurations, ordering of multiple classifiers, classifiers settings, classifier thresholds settings, or any combination thereof.

Classifier ordering module 145 may enable an improved ordering of statistical classifiers in a cascade classification system. In some embodiments, classifier ordering module 145 may be configured to perform the systems and methods described herein in conjunction with user interface 135 and application 140. User interface 135 may enable a user to interact with, control, and/or program one or more functions of classifier ordering module 145. Further details regarding the classifier ordering module 145 are discussed below.

Figure 2:
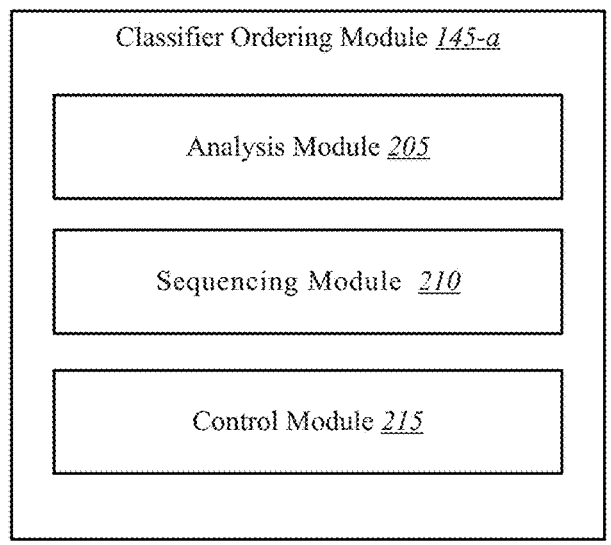
FIG. 2 is a block diagram illustrating one example of a cascade ordering module.

FIG. 2 is a block diagram illustrating one example of a classifier ordering module 145-a. Classifier ordering module 145-a may be one example of classifier ordering module 145 depicted in FIG. 1. As depicted, classifier ordering module 145-a may include analysis module 205, sequencing module 210, and control module 215.

In one embodiment, analysis module 205 may be configured to identify a first current configuration among a plurality of configurations. In one example, the first current configuration may include several classifiers configured in a certain order. In some cases, control module 215 may select a configuration from the plurality of configurations as the first current configuration. In some cases, a user may assign a configuration from the plurality of configurations as the first current configuration.

In some embodiments, analysis module 205 may be configured to determine an efficacy rating of a first current configuration. In one embodiment, analysis module 205 may run known data through the first current configuration to determine how accurately the first current configuration classifies the known data. For example, analysis module 205 may run known malware files and known clean file through the first current configuration to determine how accurately the first current configuration identifies the known malware files as containing malware and the known clean files as being clean from malware. In some cases, the efficacy rating of a configuration may be based on the classification accuracy of the analyzed configuration.

In some embodiments, sequencing module 210 may be configured to generate a decreasing sequence of values for a control parameter. In some embodiments, sequencing module 210 may generate a starting value for the control parameter and one or more values less than the starting value. For example, sequencing module 210 may select a starting value of 1.0 and an ending value of 0.0. Thus, in one embodiment, the decreasing sequence of values for the control parameter generated by sequencing module 210 may include the sequence 1.0, 0.9, 0.8, 0.7, 0.6, 0.5, 0.4, 0.3, 0.2, 0.1, and 0.0 as one example.

In some embodiments, sequencing module 210 may be configured to select a current value of the control parameter according to the decreasing sequence of values. In one embodiment, given the sequence provided above from 1.0 to 0.0, sequencing module 210 may select 1.0 as the current value of the control parameter for a first iteration. In some cases, sequencing module 210 may select the next lowest value in the decreasing sequence of values for a subsequent iteration and assign the next lowest value as the current value of the control parameter. In one embodiment, each iteration, as explained below, may include analyzing a current configuration in relation to a test or candidate configuration. In one embodiment, a current configuration may include a first set of classifiers in a first order and a test configuration may include a second set of classifiers in a second order different than the first order. In some cases, at least one of the first and second set of classifiers may include a set of cascade classifiers.

In one embodiment, sequencing module 210 may reduce the current value of the control parameter for each iteration. For example, sequencing module 210 may select 1.0 for a first iteration, 0.9 for a second iteration, and so forth. Alternatively, sequencing module 210 may reduce the value of the control parameter based on a number of iterations. For example, sequencing module 210 may reduce the value of the control parameter every 10 iterations, as one example. In some cases, the control parameter may include a time-varying parameter. For example, sequencing module 210 may reduce the value of the control parameter based on a passage of time. For instance, sequencing module 210 may reduce the value of the control parameter every 60 seconds, as one example.

In some embodiments, control module 215 may be configured to randomly select a first test configuration among the plurality of configurations based at least in part on the current value of the control parameter. In some cases, an algorithm may determine the distance or degree of variation between the current configuration and the test configuration. In some cases, a subsequent test configuration may be selected based on a probability distribution with a scale depending on the current value of the control parameter and/or depending on the difference between the efficacy ratings of a previous test configuration and a current configuration. In some embodiments, the distance or degree of variation distribution may be determined in relation to an algorithm such as a simulated annealing algorithm. In some cases, the control parameter may include a temperature value in simulated annealing algorithms and/or processes. In some embodiments, the algorithm may determine whether the test configuration performs better or worse than the current configuration. When the test configuration performs better than the current configuration, the test configuration may be selected as the new current configuration. When the new configuration performs worse or no better than the current configuration, the algorithm may select a new test configuration. In some cases, when the new configuration performs worse or no better than the current configuration, the algorithm may still make the test configuration the new current configuration.

In some cases, the algorithm may accept a worse performing configuration according to an acceptance function. For example, a worse performing configuration (test configuration or current configuration) may be selected based on a simulated annealing acceptance function where decreasing the control parameter leads to a smaller acceptance probability. Accordingly, in terms of the efficacy rating, a relatively high control parameter may allow large variations between the current configuration and a test configuration in the beginning of the analysis, but allow less and less variations as the value of the control parameter decreases.

In some embodiments, a current configuration may include a first set of classifiers. In one embodiment, a test configuration may include a second set of classifiers. In some cases, the first set of classifiers of the current configuration may include a group of classifiers in a first order, and the second set of classifiers of the test configuration may include the same group of classifiers, but in a second order, the secand order having the classifiers in a different order than that of the first order. In one embodiment, each configuration of the plurality of configurations may include a set of classifiers.

In one embodiment, each of the plurality of configurations includes the same classifiers, but each configuration includes different settings for the classifiers. Alternatively, at least one of the plurality of configurations may include one or more classifiers that are different from any other classifier in the other configurations of the plurality of configurations. In some embodiments, at least one of the configurations of the plurality of configurations may include cascading classifiers. Thus, in one embodiment, a first configuration may include classifiers arranged in a first order and a second configuration may include the same classifiers arranged in a second order that is different from the first order.

In some embodiments, analysis module 205 may be configured to analyze the first test configuration in relation to the first current configuration. In some embodiments, analysis module 205 may be configured to identify an efficacy rating of the first test configuration based on analysis of the first test configuration. In some cases, analysis module 205 may determine the efficacy rating of a configuration based at least in part on a classification accuracy of the analyzed configuration. For example, the first test configuration may include several classifiers configured in a certain order from a first classifier to a last classifier. Analysis module 205 may run known data through the classifiers of the first test configuration in the configured order, from the first classifier to the last classifier, to determine how accurately the first test configuration classifies the known data.

In some embodiments, analysis module 205 may be configured to compare the efficacy rating of the first test configuration to an efficacy rating of the first current configuration. In one embodiment, when the efficacy rating of the first test configuration is greater than the efficacy rating of the first current configuration, control module 215 may discard the first current configuration, and designate the first test configuration as the new current configuration or the second current configuration.

In some embodiments, depending on the current value of the control parameter, control module 215 may discard the first current configuration and designate the first test configuration as the second current configuration even when the efficacy rating of the first test configuration is less than or equal to the efficacy rating of the first current configuration. In one embodiment, when the new configuration performs worse or no better than the current configuration, the algorithm may still make the test configuration the new current configuration. The algorithm may accept a worse performing configuration based on an acceptance function. For example, a worse or equally performing configuration may be selected based on a simulated annealing acceptance function where decreasing the control parameter leads to a smaller acceptance probability, or a smaller likelihood of selecting the worse or equal performing configuration over the current configuration. For example, when the control parameter is at a start value or relatively near the start value of the control parameter, control module 215 may make the test configuration the new current configuration even when the efficacy rating of the test configuration does not exceed the efficacy rating of the current configuration.

In some embodiments, control module 215 may be configured to implement, based at least in part on the analyzing of the first test configuration, the first test configuration in a machine learning classification system of a computing device to improve a data classification accuracy of the computing device. In one embodiment, control module 215 may identify an unclassified file and run the unclassified file through the implemented configuration, or through the configuration the control module 215 implements based on the analysis of the plurality of configurations by the analysis module 215. In one embodiment, control module 215 may classify the unclassified file as malware or clean based at least in part on running the unclassified file through the implemented configuration. In some embodiments, control module 215 may be configured to perform a security action using the implemented configuration in the machine learning classification system.

In some embodiments, analysis module 205 may analyze configurations until an iteration threshold is satisfied. In some cases, analysis module 205 may be configured to determine whether the iteration threshold is satisfied. When the iteration threshold is satisfied, analysis module 205 may stop analyzing test configurations. When the iteration threshold is still not satisfied, analysis module 205 may continue analyzing randomly selected test configurations in relation to a current configuration. In some cases, satisfying the iteration threshold may be based on whether a maximum number of iterations have been processed. Additionally or alternatively, satisfying the iteration threshold may be based on whether a time budget is used up. Additionally or alternatively, satisfying the iteration threshold may be based at least in part on analysis module 205 determining whether a determined efficacy rating of a configuration satisfies an efficacy rating threshold. For example, a current configuration may have an efficacy rating of 65% and the efficacy rating threshold may be 90%. When the iterations determine that the efficacy rating of a test configuration is 90% or greater, than the iteration threshold may be satisfied and the test configuration with the efficacy rating of 90% or greater may be implemented in a statistical classification system. In some embodiments, control module 215 may be configured to implement the second current configuration in a machine learning classification system after selecting the second current configuration over the first current configuration based on analysis of the configurations, and when the iteration threshold is satisfied while the second current configuration remains the current configuration.

In one embodiment, when the iteration threshold is not yet satisfied, sequencing module 210 may be configured to decrease the value of the control parameter according to the decreasing sequence of values. For example, sequencing module 210 may decrease the value of the control parameter from 1.0 to 0.9 after analyzing a test configuration in relation to a current configuration and continuing with the current configuration or making the test configuration the new current configuration.

In some embodiments, control module 215 may be configured to randomly select a second test configuration among the plurality of configuration based at least in part on the decreased value of the control parameter. In some embodiments, analysis module 205 may be configured to analyze the second test configuration in relation to the second current configuration. In some embodiments, when the efficacy rating of the second test configuration is equal to or less than the efficacy rating of the second current configuration: control module 215 may keep the second current configuration and discard the second test configuration; sequencing module 210 may be configured to again decrease the value of the control parameter according to the decreasing sequence of values; and control module 215 may be configured to randomly select a third test configuration among the plurality of configuration based at least in part on the decreased value of the control parameter to enable analysis module 205 to analyze the third test configuration in relation to the second current configuration.

Figure 3:
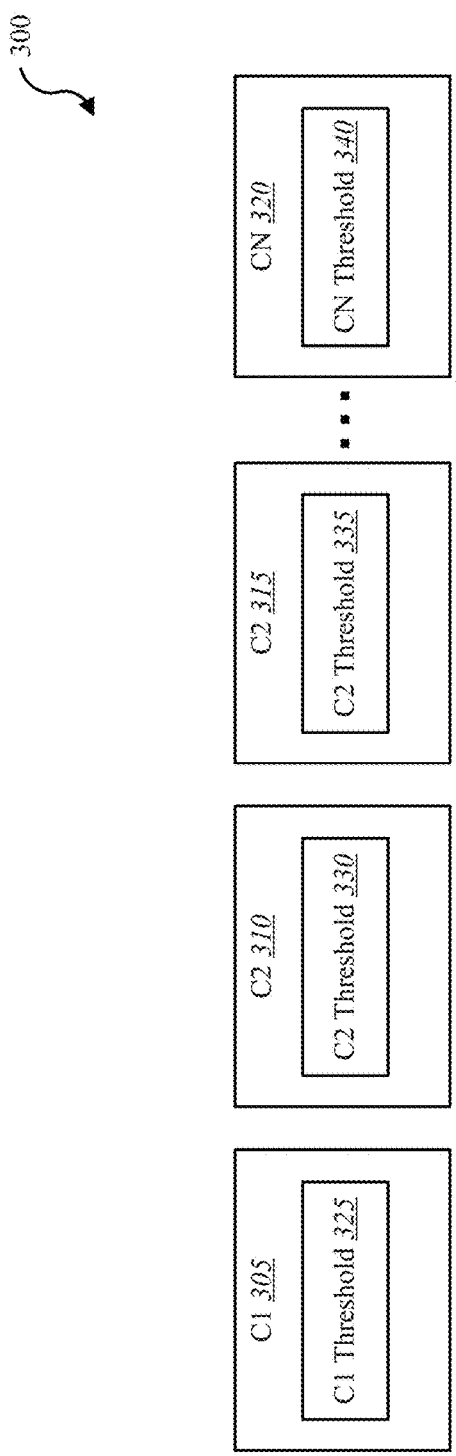
FIG. 3 is a block diagram illustrating one example of a current configuration of a cascade classification system for improving cascade classifier ordering.

FIG. 3 is a block diagram illustrating one example of a current configuration 300 of a cascade classification system. In one embodiment, current configuration 300 may include N classifiers in a predetermined order. As depicted, current configuration 300 may include a first classifier (C1) 305 in a first position, second classifier (C2) 310 in a second position, a third classifier (C3) 315 in a third position, and Nth classifier (CN) 320 in the Nth position of the predetermined order. As depicted, a classifier may include a threshold value. For example, classifier C1 305 may include C1 threshold 325, classifier C2 310 may include C2 threshold 330, and so forth.

In one embodiment, the current configuration 300 may be analyzed. The current configuration 300 may be given an efficacy rating based at least in part on this analysis. The efficacy rating may be based on how accurately the current configuration 300 classifies a set of known files such as a set of files that includes known malware files and known clean files.

Figure 4:
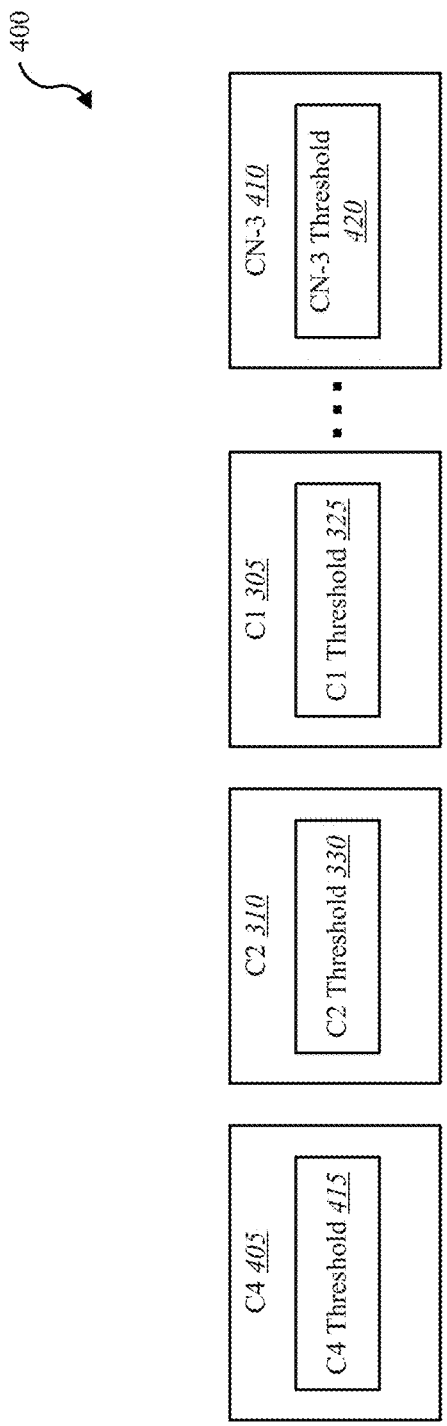
FIG. 4 is a block diagram illustrating one example of a test configuration of a cascade classification system for improving cascade classifier ordering.

FIG. 4 is a block diagram illustrating one example of a test configuration 400 of a cascade classification system. In one embodiment, test configuration 400 may include N classifiers in a predetermined order. As depicted, test configuration 400 may include a first classifier (C4) 405 in a first position, second classifier (C2) 310 in a second position, a third classifier (C1) 305 in a third position, and N-3 classifier (CN-3) 410 in the Nth position of the predetermined order. As depicted, a classifier may include a threshold value. For example, classifier C4 405 may include C4 threshold 415, classifier C2 310 may include C2 threshold 330, and so forth.

In one embodiment, test configuration 400 may be selected in relation to a decreasing of a control parameter such as a sequential decreasing of a temperature value in a simulated annealing algorithm. In one embodiment, one or more aspects of classifiers in test configuration 400 may be modified in relation to the classifiers of current configuration 300 of FIG. 3. In some cases, the modification of test configuration 400 in relation to current configuration 300 may include modifying a threshold of one or more classifiers from the current configuration 300, modifying an ordering of the classifiers in the current configuration 300, replacing one or more classifiers in the current configuration 300 with one or more different classifiers not in the current configuration 300, or any combination thereof. For example, the order of one or more classifiers in current configuration 300 may be modified resulting in the order of classifiers in test configuration 400. Thus, instead of starting with classifier C1 305 as in current configuration 300, the test configuration 400 may start with classifier C4 405. In one embodiment, a threshold of at least one classifier in test configuration 400 may be modified in relation to current configuration 300. For example, the C2 threshold 330 of current configuration 300 may be set at a first level, while the C2 threshold 330 of test configuration 400 may be modified to a second level that is different than the first level. As depicted, test configuration 400 may include at least one or more of the same classifiers as current configuration 300. In some cases, test configuration 400 may include one or more classifiers different from the classifiers of current configuration 300. In one embodiment, test configuration 400 may include all different classifiers.

In one embodiment, the test configuration 400 may be analyzed. The test configuration 400 may be given an efficacy rating based at least in part on this analysis. The efficacy rating may be based on how accurately the test configuration 400 classifies a set of known files such as a set of files that includes known malware files and known clean files. In some cases, the efficacy rating of test configuration 400 may be analyzed in relation to the efficacy rating of current configuration 300 as part of a process to identify an optimal configuration in a cascade classification system.

Figure 5:
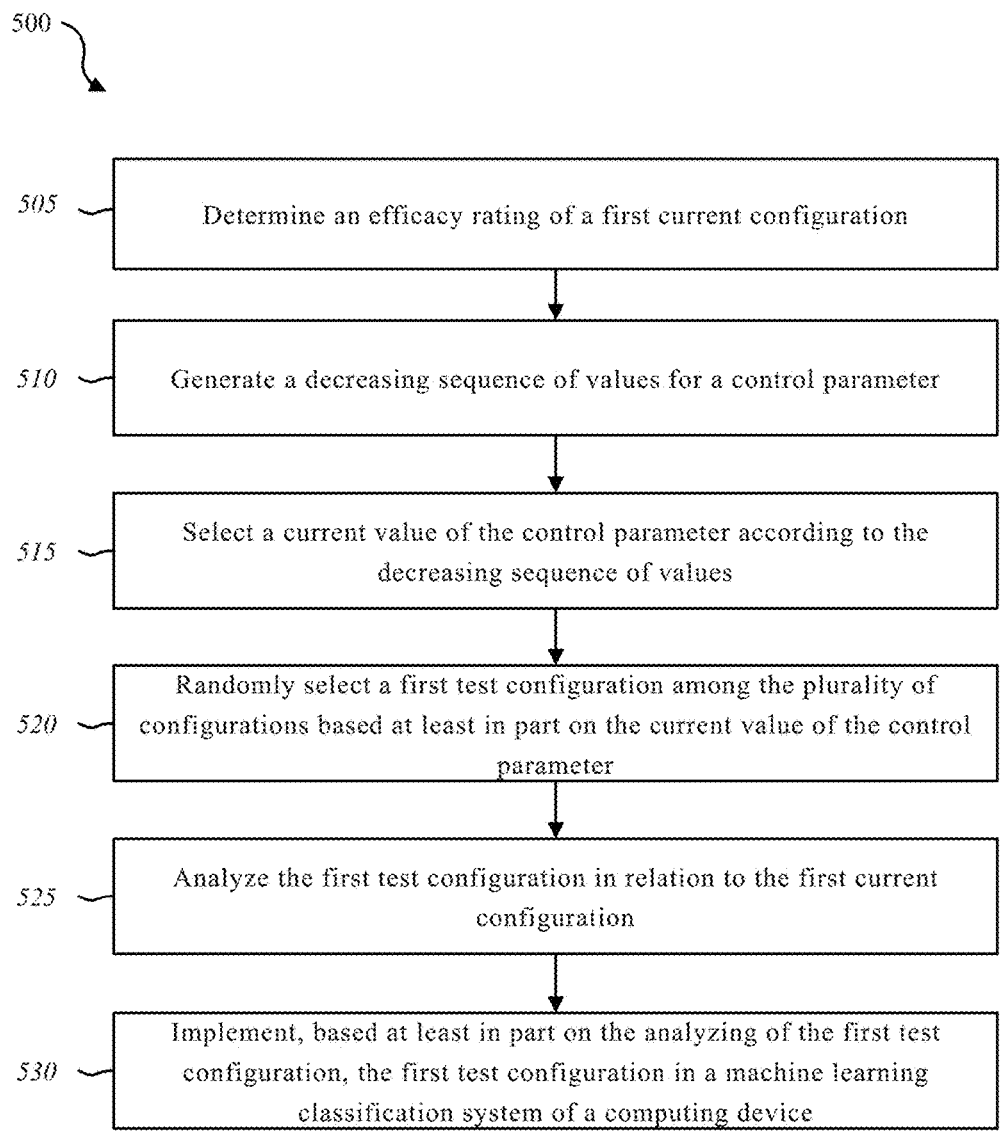
FIG. 5 is a flow diagram illustrating one embodiment of a method for improving cascade classifier ordering.

FIG. 5 is a flow diagram illustrating one embodiment of a method 500 for improving cascade classifier ordering. In some configurations, the method 500 may be implemented by the classifier ordering module 145 illustrated in FIG. 1 or 2. In some configurations, the method 500 may be implemented in conjunction with the application 140 and/or the user interface 135 illustrated in FIG. 1.

At block 505, the method 500 may include determining an efficacy rating of a first current configuration. At block 510, the method 500 may include generating a decreasing sequence of values for a control parameter. At block 515, the method 500 may include selecting a current value of the control parameter according to the decreasing sequence of values. At block 520, the method 500 may include randomly selecting a first test configuration among the plurality of configurations based at least in part on the current value of the control parameter. At block 525, the method 500 may include analyzing the first test configuration in relation to the first current configuration. At block 530, the method 500 may include implementing, based at least in part on the analyzing of the first test configuration, the first test configuration in a machine learning classification system of a computing device. In some cases, implementing the first test configuration in the machine learning classification system may improve a data classification accuracy of the computing device.

Figure 6:
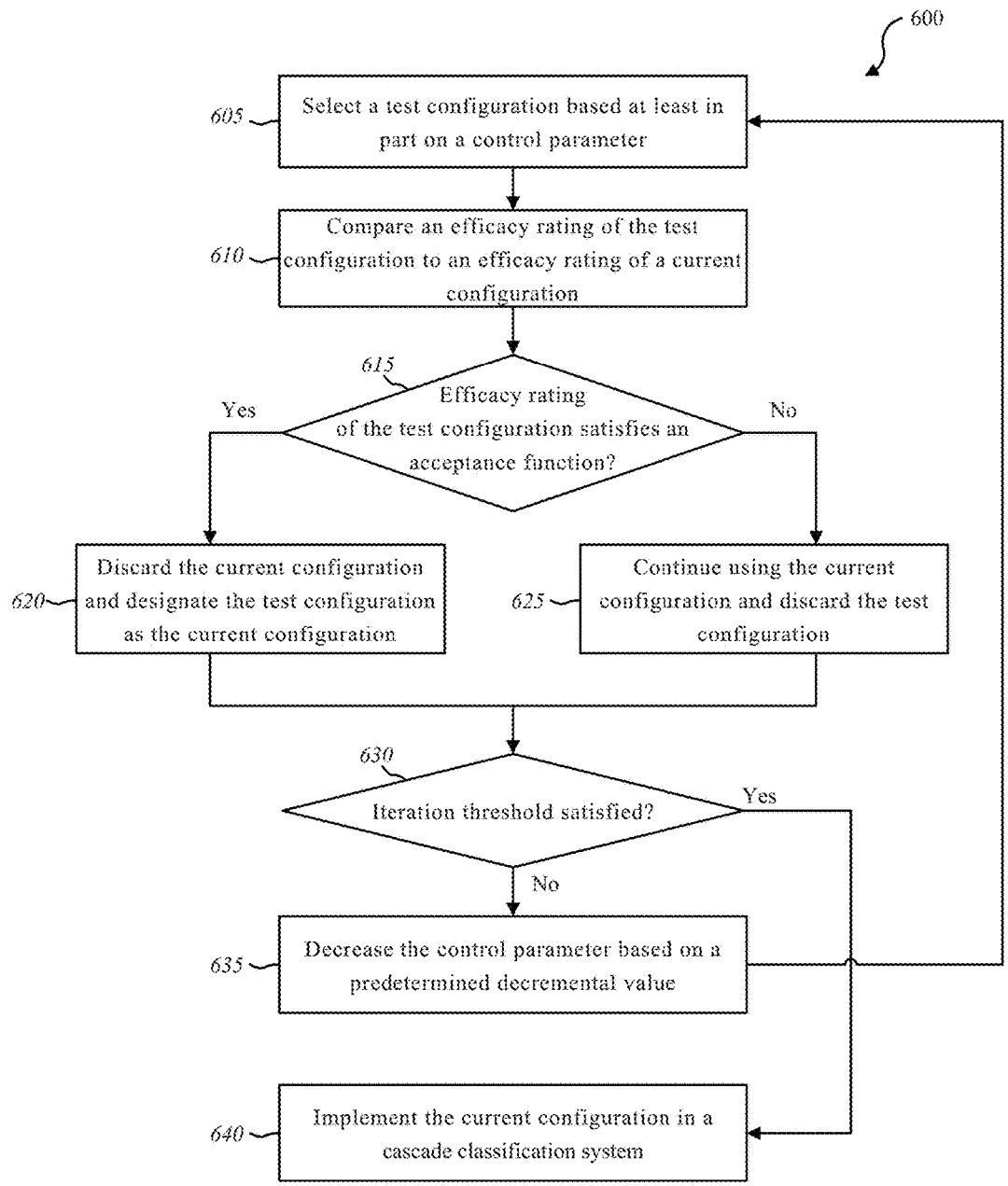
FIG. 6 is a flow diagram illustrating one embodiment of a method for improving cascade classifier ordering.

FIG. 6 is a flow diagram illustrating one embodiment of a method 600 for improving cascade classifier ordering. In some configurations, the method 600 may be implemented by the classifier ordering module 145 illustrated in FIGS. 1 and/or 2. In some configurations, the method 600 may be implemented in conjunction with the application 140 and/or the user interface 135 illustrated in FIG. 1.

At block 605, method 600 may include selecting a test configuration based at least in part on a control parameter. At block 610, method 600 may include comparing an efficacy rating of the test configuration to an efficacy rating of a current configuration At block 615, method 600 may include determining whether the efficacy rating of the test configuration satisfies an acceptance function. In one embodiment, the acceptance function may be based on a value determined from the inverse of 1 plus e((difference of the efficacy rating of the test configuration and the efficacy rating of the current configuration)/(current value of the control parameter)), where e is the universal constant approximately equal to 2.718281828.

At block 620, when method 600 determines the efficacy rating of the test configuration satisfies the acceptance function, method 600 may include discarding the current configuration and designating the test configuration as the current configuration. At block 625, when method 600 determines the efficacy rating of the test configuration fails to satisfy the acceptance function, method 600 may include continuing to use the current configuration and discarding the test configuration.

At block 630, method 600 may include determining whether an iteration threshold is satisfied. At block 635, when method 600 determines the iteration threshold is not satisfied, method 600 may include decreasing the control parameter based on a predetermined decremental value and then returning to block 605 to select a new test configuration. As one example, the starting value of the control parameter may be 1.0 and the predetermined decremental value may be 0.01. Thus, the control parameter may be decremented by 0.01 each iteration. Alternatively, the control parameter may be decreased based on a sequence of predetermined decreasing values and each iteration the current value of the control parameter may be replaced by the next lowest value in the sequence of predetermined decreasing values. At block 640, when method 600 determines the iteration threshold is not satisfied, method 600 may include implementing the current configuration in a cascade classification system, the current configuration being either the original current configuration used from block 625 or the test configuration being designated as the new current configuration at block 620.

Figure 7:
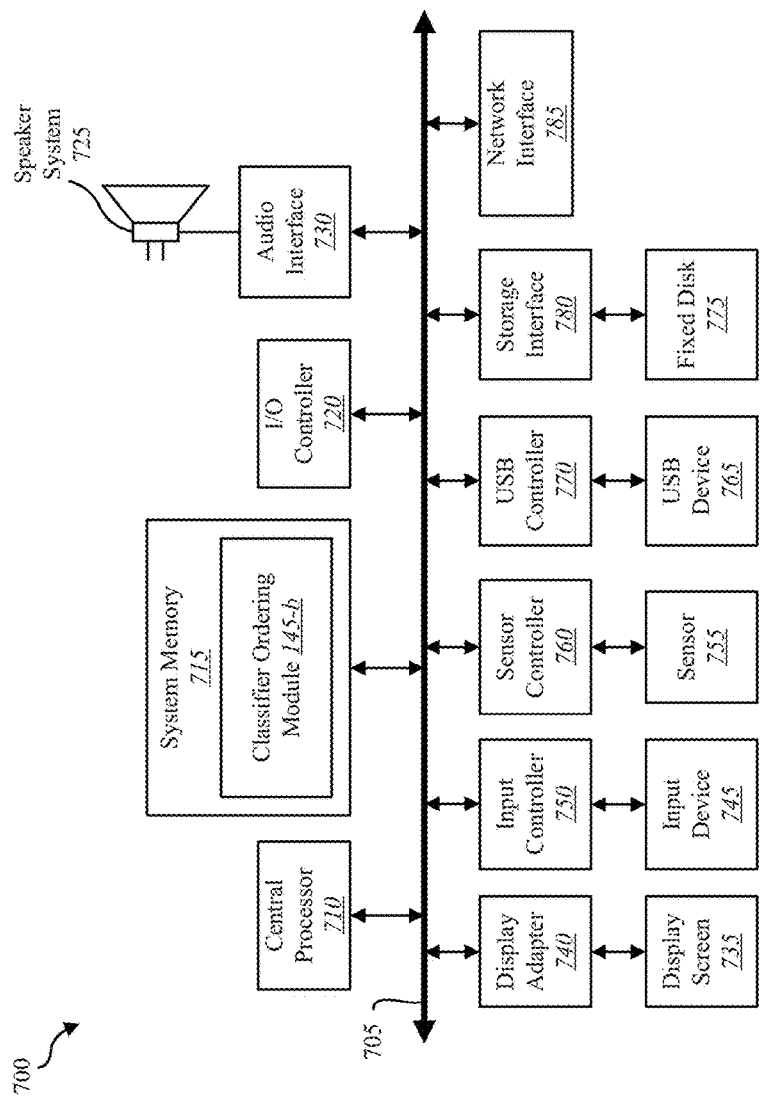
FIG. 7 depicts a block diagram of a computer system suitable for implementing the present systems and methods.

FIG. 7 depicts a block diagram of a computing device 700 suitable for implementing the present systems and methods. The device 700 may be an example of device 105, and/or server 110 illustrated in FIG. 1. In one configuration, device 700 includes a bus 705 which interconnects major subsystems of device 700, such as a central processor 710, a system memory 715 (typically RAM, but which may also include ROM, flash RAM, or the like), an input/output controller 720, an external audio device, such as a speaker system 725 via an audio output interface 730, an external device, such as a display screen 735 via display adapter 740, an input device 745 (e.g., remote control device interfaced with an input controller 750), multiple USB devices 765 (interfaced with a USB controller 770), and a storage interface 780. Also included are at least one sensor 755 connected to bus 705 through a sensor controller 760 and a network interface 785 (coupled directly to bus 705).

Bus 705 allows data communication between central processor 710 and system memory 715, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the classifier ordering module 145-$b$ to implement the present systems and methods may be stored within the system memory 715. Applications (e.g., application 140) resident with device 700 are generally stored on and accessed via a non-transitory computer readable medium, such as a hard disk drive (e.g., fixed disk 775) or other storage medium. Additionally, applications can be in the form of electronic signals modulated in accordance with the application and data communication technology when accessed via interface 785.

Storage interface 780, as with the other storage interfaces of device 700, can connect to a standard computer readable medium for storage and/or retrieval of information, such as a fixed disk drive 775. Fixed disk drive 775 may be a part of device 700 or may be separate and accessed through other interface systems. Network interface 785 may provide a direct connection to a remote server via a direct network link to the Internet via a POP (point of presence). Network interface 785 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to device 700 wirelessly via network interface 785.

Many other devices and/or subsystems may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 7 need not be present to practice the present systems and methods. The devices and subsystems can be interconnected in different ways from that shown in FIG. 7. The aspect of some operations of a system such as that shown in FIG. 7 are readily known in the art and are not discussed in detail in this application. Code to implement the present disclosure can be stored in a non-transitory computer-readable medium such as one or more of system memory 715 or fixed disk 775. The operating system provided on device 700 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The signals associated with system 700 may include wireless communication signals such as radio frequency, electromagnetics, local area network (LAN), wide area network (WAN), virtual private network (VPN), wireless network (using 802.11, for example), cellular network (using 3G and/or LTE, for example), and/or other signals. The network interface 785 may enable one or more of WWAN (GSM, CDMA, and WCDMA), WLAN (including BLUETOOTH® and Wi-Fi), WMAN (WiMAX) for mobile communications, antennas for Wireless Personal Area Network (WPAN) applications (including RFID and UWB), etc The I/O controller 720 may operate in conjunction with network interface 785 and/or storage interface 780. The network interface 785 may enable system 700 with the ability to communicate with client devices (e.g., device 105 of FIG. 1), and/or other devices over the network 115 of FIG. 1. Network interface 785 may provide wired and/or wireless network connections. In some cases, network interface 785 may include an Ethernet adapter or Fibre Channel adapter. Storage interface 780 may enable system 700 to access one or more data storage devices. The one or more data storage devices may include two or more data tiers each. The storage interface 780 may include one or more of an Ethernet adapter, a Fibre Channel adapter, Fibre Channel Protocol (FCP) adapter, a SCSI adapter, and iSCSI protocol adapter.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

As used herein, the term "security action" may refer to any number of actions the systems described herein may take after determining that a file likely includes some type of malware. For example, types of security actions may include preventing the file from performing any actions on the computing device, alerting an administrator to the potential maliciousness of the file, quarantine the file, delete the file, block a download of the file, and/or warn a user about the file. In addition, the systems described herein may perform a security action on objects other than a file. For example, the systems described herein may blacklist malicious URLs and/or IP addresses. Thus, the security actions in conjunction with the methods and systems described herein may improve the security and operating integrity of one or more computing devices by protecting the hardware, firmware, software, or any combination thereof of the one or more computing devices from malicious attack. It should be appreciated that these are not exhaustive lists of the types of security actions which may be performed by the systems described herein. Other security actions are also included in this disclosure.

What is claimed is:
1. A method for improving data classification accuracy, comprising:
   determining an efficacy rating of a first current configuration;

generating a decreasing sequence of values for a control parameter;

selecting a current value of the control parameter according to the decreasing sequence of values;

randomly selecting a first test configuration among the plurality of configurations based at least in part on the current value of the control parameter;

analyzing the first test configuration in relation to the first current configuration;

implementing, based at least in part on the analyzing of the first test configuration, the first test configuration in a machine learning classification system of a computing device to improve a data classification accuracy of the computing device;

analyzing a second test configuration in relation to the first test configuration;

implementing, based at least in part on the analyzing of the second test configuration, the second test configuration in the machine learning classification system;

analyzing a third test configuration in relation to the second test configuration; and performing a security action using at least one of the second test configuration and the third test configuration in the machine learning classification system.

2. The method of claim 1, comprising:

identifying an efficacy rating of the first test configuration; and comparing the efficacy rating of the first test configuration to the efficacy rating of the first current configuration.

3. The method of claim 2, comprising:

when the efficacy rating of the first test configuration is greater than the efficacy rating of the first current configuration, discarding the first current configuration and designating the first test configuration as a second current configuration.

4. The method of claim 3, comprising:

determining whether an iteration threshold is satisfied, the iteration threshold being based on whether a maximum number of iterations have been processed, or whether a time budget is used up, or any combination thereof.

5. The method of claim 4, comprising:

implementing the second current configuration in the machine learning classification system when the iteration threshold is satisfied.

6. The method of claim 4, comprising:

when the iteration threshold is not yet satisfied:

decreasing the value of the control parameter according to the decreasing sequence of values, and randomly selecting the second test configuration among the plurality of configuration based at least in part on the decreased value of the control parameter.

7. The method of claim 6, comprising:

analyzing the second test configuration in relation to the second current configuration.

8. The method of claim 7, comprising:

when the efficacy rating of the second test configuration is equal to or less than the efficacy rating of the second current configuration:

decreasing the value of the control parameter according to the decreasing sequence of values, and randomly selecting the third test configuration among the plurality of configuration based at least in part on the decreased value of the control parameter.

9. The method of claim 1, a distance of the first test configuration from the first current configuration being selected according to a probability distribution with a scale depending on the current value of the control parameter, the first current configuration comprising a first set of classifiers in a first order, the first test configuration comprising a second set of classifiers in a second order different than the first order, at least one of the first and second set of classifiers comprising cascade classifiers.

10. A computing device configured for improving data classification accuracy, comprising:

a processor;

memory in electronic communication with the processor, wherein the memory stores computer executable instructions that when executed by the processor cause the processor to perform the steps of:

determining an efficacy rating of a first current configuration;

generating a decreasing sequence of values for a control parameter;

selecting a current value of the control parameter according to the decreasing sequence of values;

randomly selecting a first test configuration among the plurality of configurations based at least in part on the current value of the control parameter;

analyzing the first test configuration in relation to the first current configuration;

implementing, based at least in part on the analyzing of the first test configuration, the first test configuration in a machine learning classification system of a computing device to improve a data classification accuracy of the computing device;

analyzing a second test configuration in relation to the first test configuration;

implementing, based at least in part on the analyzing of the second test configuration, the second test configuration in the machine learning classification system;

analyzing a third test configuration in relation to the second test configuration; and performing a security action using at least one of the second test configuration and the third test configuration in the machine learning classification system.

11. The computing device of claim 10, wherein the instructions executed by the processor cause the processor to perform the steps of:

identifying the efficacy rating of the first test configuration; and comparing the efficacy rating of the first test configuration to an efficacy rating of the first current configuration.

12. The computing device of claim 11, wherein the instructions executed by the processor cause the processor to perform the steps of:

when the efficacy rating of the first test configuration is greater than the efficacy rating of the first current configuration, discarding the first current configuration and designating the first test configuration as a second current configuration.

13. The computing device of claim 12, wherein the instructions executed by the processor cause the processor to perform the steps of:

determining whether an iteration threshold is satisfied, the iteration threshold being based on whether a maximum number of iterations have been processed, or whether a time budget is used up, or any combination thereof.

14. The computing device of claim 13, wherein the instructions executed by the processor cause the processor to perform the steps of:

implementing the second current configuration in the machine learning classification system when the iteration threshold is satisfied.

15. The computing device of claim 13, wherein the instructions executed by the processor cause the processor to perform the steps of:
when the iteration threshold is not yet satisfied:
decreasing the value of the control parameter according to the decreasing sequence of values, and
randomly selecting the second test configuration among the plurality of configuration based at least in part on the decreased value of the control parameter.

16. The computing device of claim 15, wherein the instructions executed by the processor cause the processor to perform the steps of:
analyzing the second test configuration in relation to the second current configuration.

17. The computing device of claim 16, wherein the instructions executed by the processor cause the processor to perform the steps of:
when the efficacy rating of the second test configuration is equal to or less than the efficacy rating of the second current configuration:
decreasing the value of the control parameter according to the decreasing sequence of values, and
randomly selecting the third test configuration among the plurality of configuration based at least in part on the decreased value of the control parameter.

18. A non-transitory computer-readable storage medium storing computer executable instructions that when executed by a processor cause the processor to perform the steps of:
determining an efficacy rating of a first current configuration;
generating a decreasing sequence of values for a control parameter;
selecting a current value of the control parameter according to the decreasing sequence of values;
randomly selecting a first test configuration among the plurality of configurations based at least in part on the current value of the control parameter;
analyzing the first test configuration in relation to the first current configuration;
implementing, based at least in part on the analyzing of the first test configuration, the first test configuration in a machine learning classification system of a computing device to improve a data classification accuracy of the computing device;
analyzing a second test configuration in relation to the first test configuration;
implementing, based at least in part on the analyzing of the second test configuration, the second test configuration in the machine learning classification system;
analyzing a third test configuration in relation to the second test configuration; and
performing a security action using at least one of the second test configuration and the third test configuration in the machine learning classification system.

19. The computer-program product of claim 18,
wherein the instructions executed by the processor cause the processor to perform the steps of:
identifying the efficacy rating of the first test configuration; and
comparing the efficacy rating of the first test configuration to an efficacy rating of the first current configuration.

* * * * *